(12) United States Patent
Landau

(10) Patent No.: US 10,736,815 B1
(45) Date of Patent: Aug. 11, 2020

(54) SCENT RELEASING INSERT FOR CONFINED CONTAINERS

(71) Applicant: ScentSational Technologies, LLC, Jenkintown, PA (US)

(72) Inventor: Steven M. Landau, Meadowbrook, PA (US)

(73) Assignee: ScentSational Technologies, LLC, Jenkintown, PA (US)

( * ) Notice: Subject to any disclaimer, the term of this patent is extended or adjusted under 35 U.S.C. 154(b) by 0 days.

(21) Appl. No.: 16/257,057

(22) Filed: Jan. 24, 2019

(51) Int. Cl.
*A61J 1/03* (2006.01)
*B65D 83/04* (2006.01)
*A61J 1/14* (2006.01)
*C08L 25/08* (2006.01)

(52) U.S. Cl.
CPC . *A61J 1/03* (2013.01); *A61J 1/14* (2013.01); *B65D 83/04* (2013.01); *C08L 25/08* (2013.01)

(58) Field of Classification Search
CPC ...... A23G 1/00; A61J 1/03; A61J 1/14; B65D 81/26; B65D 83/04; C08L 25/08; B65B 5/10
USPC ....... 206/204–213.1, 530, 540; 426/112–131
See application file for complete search history.

(56) References Cited

U.S. PATENT DOCUMENTS

| | | | |
|---|---|---|---|
| 5,759,241 A | 6/1998 | Klett et al. | |
| 6,123,189 A * | 9/2000 | Falkenberg | B65D 81/3233 206/217 |
| 6,571,942 B2 * | 6/2003 | Riemenschneider | B65D 81/266 206/204 |
| 6,688,468 B2 * | 2/2004 | Waterman | A61J 1/00 206/540 |
| 7,137,570 B2 * | 11/2006 | Wheatley | A61L 9/12 239/32 |
| 7,780,008 B2 * | 8/2010 | Portier | B65D 83/0481 206/540 |
| 8,460,609 B1 | 6/2013 | Wheatley et al. | |
| 10,124,941 B2 * | 11/2018 | Sibley | B65D 81/268 |
| 2003/0000177 A1 * | 1/2003 | Landau | B65D 51/24 53/428 |
| 2004/0018278 A1 * | 1/2004 | Popplewell | B32B 27/08 426/132 |
| 2004/0028779 A1 * | 2/2004 | Landau | A47G 19/2227 426/132 |
| 2004/0222108 A1 * | 11/2004 | Tommarello | A61B 50/30 206/205 |
| 2006/0099168 A1 | 5/2006 | Corzani et al. | |

(Continued)

FOREIGN PATENT DOCUMENTS

WO  WO 2016/150854  9/2016

*Primary Examiner* — Bryon P Gehman
(74) *Attorney, Agent, or Firm* — LaMorte & Associates, P.C.

(57) ABSTRACT

A system and method for altering the scent within the headspace of a product's packaging, such as a pill container. In the container, the pills or other consumable product partially fill the container. A scent release insert is placed into the container along with the consumable contents of the container. The scent release insert is elastomeric and is readily deformed by the consumable product within the container. As such, the scent release insert can be deformed into many of the voids within the container, therein making efficient use of space within the container. The scent release insert emits scent into the container and alters the scent of the head space within the container.

13 Claims, 5 Drawing Sheets

(56) References Cited

U.S. PATENT DOCUMENTS

| 2008/0295457 | A1 | 12/2008 | Kaniecki et al. | |
|---|---|---|---|---|
| 2011/0155606 | A1 | 6/2011 | McKillip et al. | |
| 2014/0238889 | A1* | 8/2014 | Sunder ................... | B65D 85/70 |
| | | | | 206/526 |

* cited by examiner

SCENT RELEASING INSERT FOR CONFINED CONTAINERS

BACKGROUND OF THE INVENTION

1. Field of the Invention

In general, the present invention relates to inserts that are used to add scent to the confines of a container for the purpose of supplementing or masking the natural scent of the product packaged in the container.

2. Prior Art Description

Medications, vitamins and dietary supplements are often manufactured into pills or capsules to control dose size and to make the material easy to consume. The various pills and capsules are often packaged in an air-tight container. This prevents the pills and capsules from reacting with air and also prevents children from accessing the pills. To minimize costs, the container used to hold the various pills or capsules is usually just large enough to hold the supply of pills and capsules being sold. In this manner, no expenses are wasted in making and shipping pill containers that are larger than they need to be.

Since pill containers are selected to match the supply of pills being packaged, there is often very little headspace within a container that is not being utilized. Additionally, manufacturers often try to keep unused headspace in a container to a minimum in order to prevent the pills and capsules from moving around and becoming damaged during processing and shipping.

In the past, extra headspace in a container was filled with cotton or another inert packing material to minimize product damage. However, in order to eliminate excess manufacturing costs, modern packaging techniques customize the size and volume of the container to eliminate most of the headspace within the container and therein eliminate the need for packing material.

Many medications, vitamins and/or dietary supplements have strong scents. Often these scents are unpleasant. The scent from a collection of pills or capsules collects within the container and is released each time the container is opened. Manufacturers do not want a customer to smell an unpleasant scent each time their product is used. As a consequence, some manufacturers package malodorous pills and capsules with scented inserts that emit a pleasant aroma into the headspace of the container.

Scented materials are added to pill and capsule containers in different ways. Many pill and capsule containers contain desiccant packets that are used to absorb any moisture within the container. Attempts have been made to add scent to the desiccant packets. However, due to the absorptive nature of desiccant materials, scent tends to be absorbed by the desiccant package rather than migrate way from the desiccant package. Such prior art is exemplified by U.S. Pat. No. 5,759,241 to Klett.

There are scented inserts that are made of scented plastic and are not desiccants. In German Patent Application No. WO2016150854, scent is added to a plastic rod. The rod can be placed inside a package, wherein the scent escapes the rod and adds scent to the surrounding environment. Other similar products exist where scented plastic is molded into a distinct shape. The problem with such prior art is that the plastic object must have significant mass and surface area in order to emit enough scent to mask or supplement the smell of pills or capsules in a confined space. Accordingly, the scented plastic would take up a significant amount of space available within the pill container. This requires that a large pill container be used. This, in turn, increases the costs of manufacture and shipping. Additionally, the presence of the scented plastic insert within the container complicates the process of filling the container with pills or capsules because the scented plastic insert can move into many orientations within the container.

In the prior art, the problem of adding both pills and a scented plastic insert to a confined container is typically approached by adding the scented plastic insert last. However, this positions the scented plastic insert near the top of the container. The scented plastic insert is, therefore, often removed to access the pills or capsules. Once removed, the scented plastic is seldom replaced, and the container will assume the malodorous smell of the pills or capsules.

A need therefore exists for an improved system of adding sent to the confines of a pill container that minimizes the obstructions caused by the presence of a scented plastic. A need also exists for a system that can add scented material to a container without requiring the use of a larger container. These needs are met by the present invention as described and claimed below.

SUMMARY OF THE INVENTION

The present invention is a system and method for altering the scent within the headspace of a product's packaging, such as the headspace in a pill container. In the container, the pills or other consumable product partially fill the container. However, voids exist between the pills and between the pills and the container.

A scent release insert is placed into the container along with the consumable contents of the container. The scent release insert is elastomeric and is readily deformed by the consumable product within the container. As such, the scent release insert can be deformed into many of the voids within the container, therein making efficient use of space within the container. The scent release insert emits scent into the container and alters the scent of the head space within the container.

BRIEF DESCRIPTION OF THE DRAWINGS

For a better understanding of the present invention, reference is made to the following description of exemplary embodiments thereof, considered in conjunction with the accompanying drawings, in which.

DETAILED DESCRIPTION OF THE DRAWINGS

Although the present invention system and method can be embodied in many ways, only two exemplary embodiments are illustrated. The two embodiments are both for use in a traditional pill container. The embodiments are selected in order to set forth two of the best modes contemplated for the invention. The illustrated embodiments, however, are merely exemplary and should not be considered limitations when interpreting the scope of the appended claims.

Figure 1:
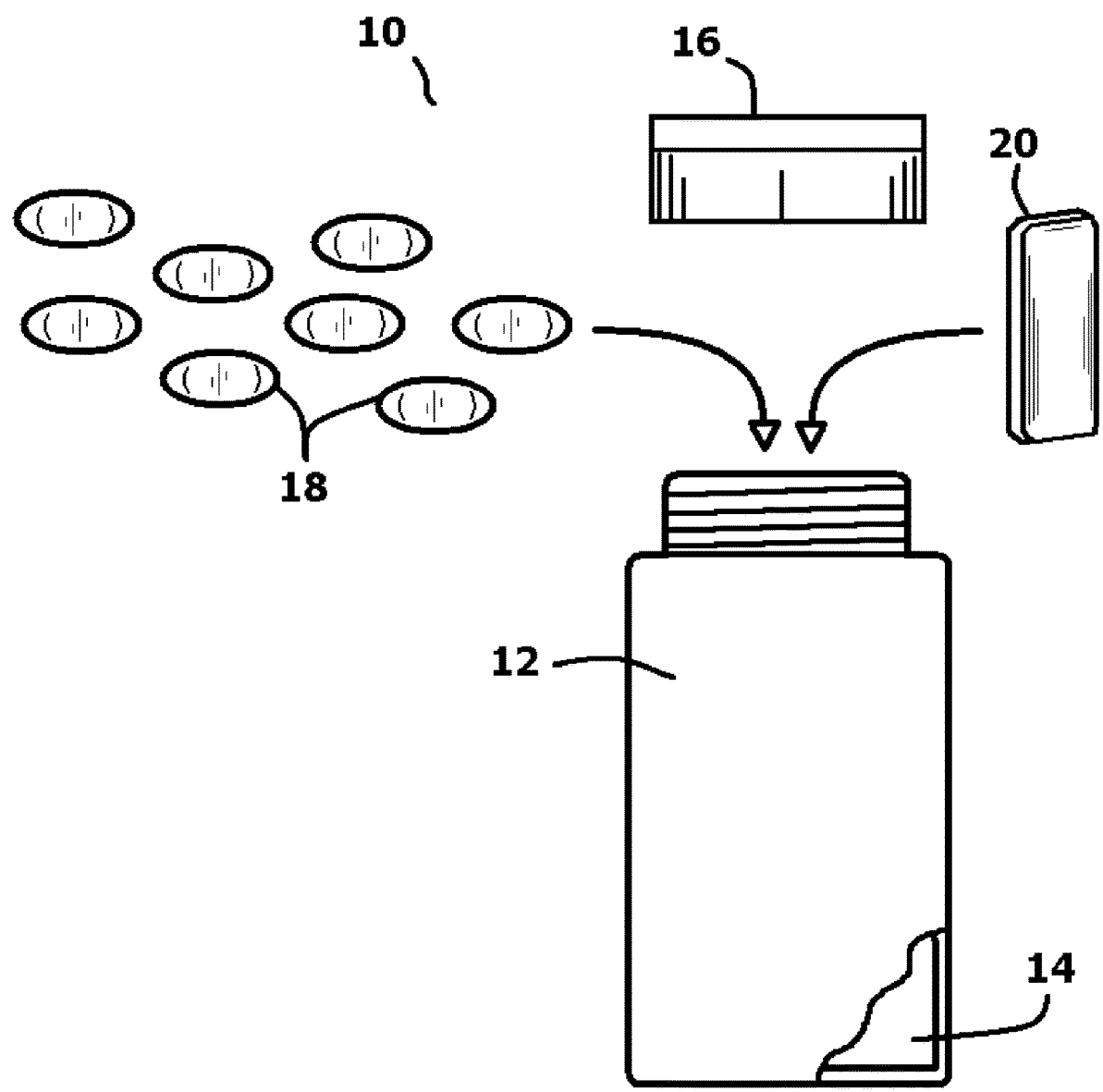
FIG. 1 is an exploded view of a first embodiment of a system that includes a pill container, pills and a unistructural scent release insert.
Figure 2:
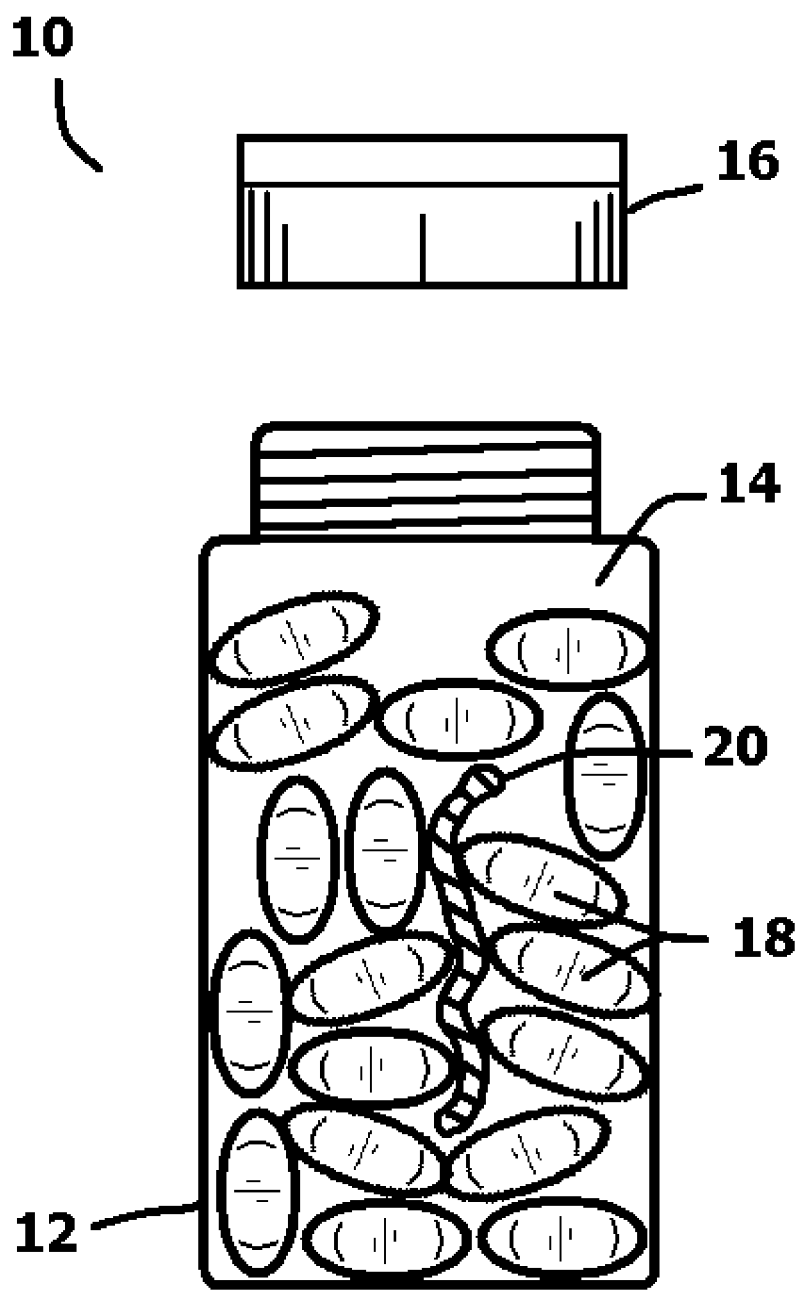
FIG. 2 is a cross-sectional view of the exemplary system of FIG. 1 shown with the scent release insert positioned near the center of the container.
Figure 3:
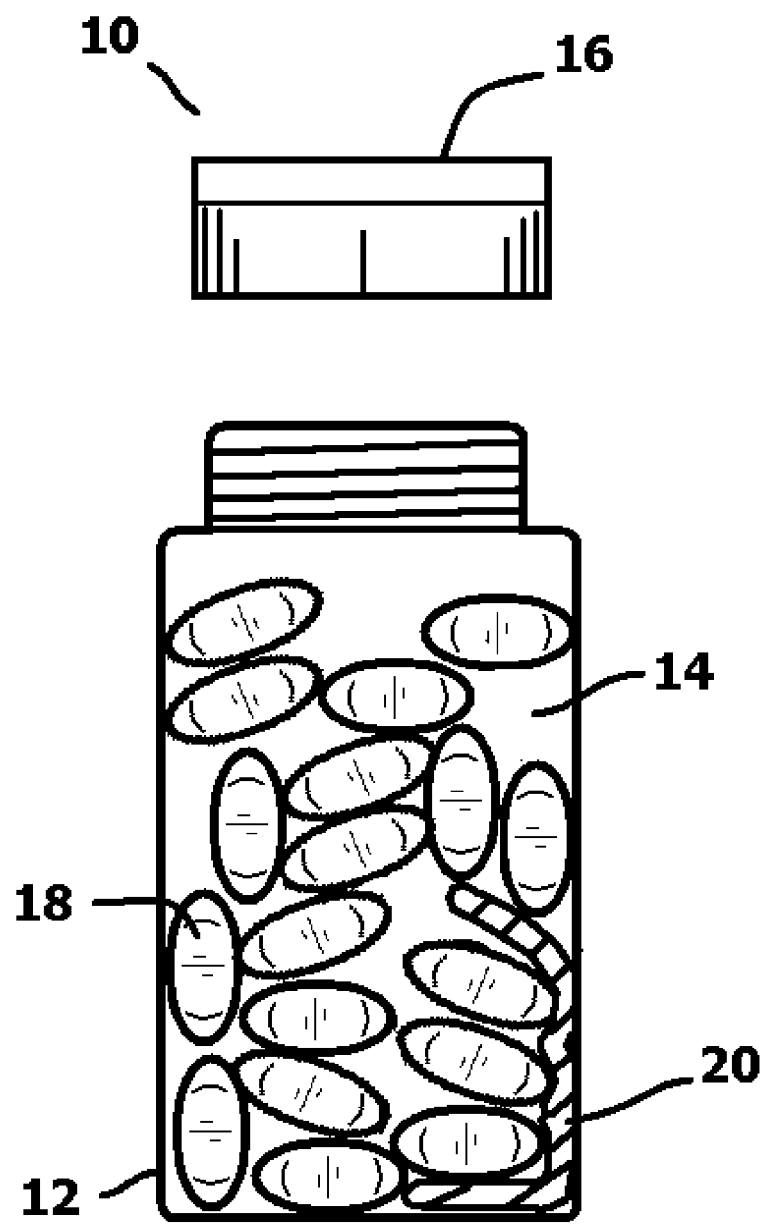
FIG. 3 is a cross-sectional view of the exemplary system of FIG. 1 shown with the scent release insert positioned near the bottom of the container.

Referring to FIG. 1, in conjunction with FIG. 2 and FIG. 3, the present invention system 10 is shown. The system 10 includes a traditional pill container 12 that defines an internal compartment 14. The pill container 12 has a closure 16 and is filled with a supply of gummy supplements, capsules or pills 18. The container 12 is sized to hold the supply of pills 18 therein, leaving a limited amount of open head space in the pill container 12. Although there is limited head space in the container 12, there are many voids 19 between the pills 18 and voids 19 between the pills 18 and the interior surfaces of the pill container 12.

A scent release insert 20 is provided. The scent release insert 20 is made from a plastic composition 22 that is flexible, soft and malleable. As such, the scent release insert 20 can be added to the pill container 12 before the pills 18 are added or as the pills are added. The pills 18 will press against and deform the scent release insert 20, wherein the scent release insert 20 will deform into some of the voids 19 between and around the various pills 18. As will be later explained in more detail, the scent release insert 20 can be made as a single molded piece or as a prepackaged assemblage of small pieces of plastic.

Figure 4:
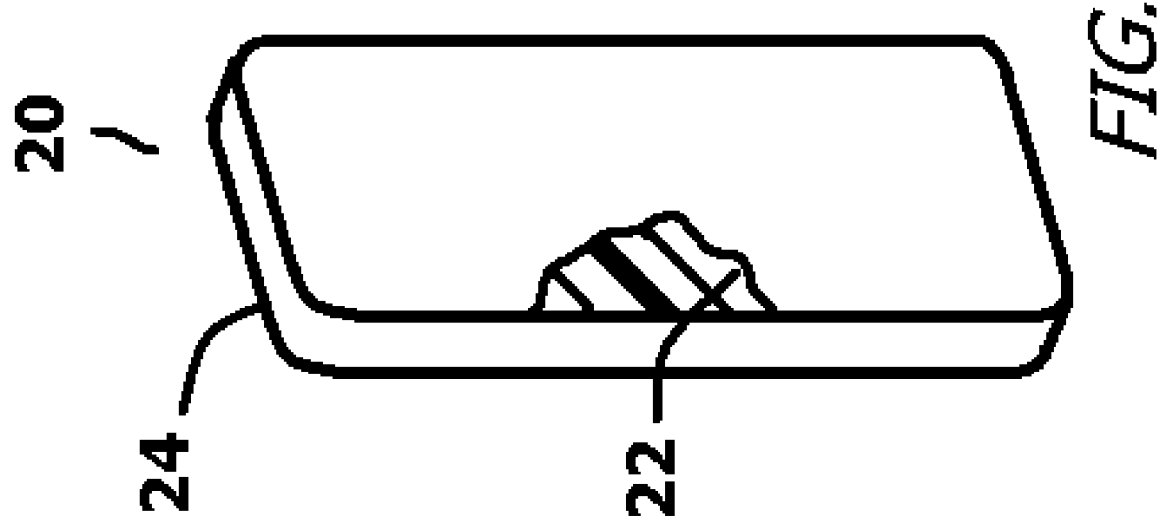
FIG. 4 shows a perspective view of a first embodiment of the scent release insert.

Referring to FIG. 4, a first construct 24 for the scent release insert 20 is shown. In this construct 24, the scent release insert 20 is a unistructural body of a specialized plastic composition 22. The plastic composition 22 is soft and malleable, and is preferably a thermoplastic elastomer, such as a styrene-based block copolymer or a vinyl-based copolymer that is mixed with a plasticizing oil and/or a scented oil. The plasticizing oil and scented oil must both be approved for human digestion by the FDA, in case the scent release insert 20 is accidentally ingested. The plasticizing oil is preferably mineral oil. However, various food grade vegetable oils and solvents can be used if such oils mix better with the selected scented oil. The scented oil has a scent that can either mask or supplement the scent emitted by the pills 18. Scent combinations are learned by trial and error. For instance, scents of citrus, such as lemon and orange, have been found as good scents for masking the strong scent of fish oil pills.

The scent release insert 20 is preferably formed into a flattened elongated shape. This both mimics the shape of traditional desiccant packs and enhances the ability of the scent release insert 20 to flex and bend. The length L1 of the scent release insert 20 is between 15 mm and 50 mm, with a preferred length of approximately 37 mm. The width W1 of the scent release insert 20 has a width of between 8 mm and 15 mm, with a preferred width of approximately 12 mm. The thickness T1 of the scented release insert 20 has a thickness of between 3 mm and 8 mm, with a preferred thickness of approximately 5 mm. The preferred width W1 is at least twice as long as the selected thickness T1. The preferred length L1 is at least twice as long as the selected width W1. These dimension ranges ensure that the scent release insert 20 is flexible as well as ensuring that the size of the scent release insert 20 matches the common dimensions of existing desiccant packs. Many commercial automated pill container filling machines are fitted to place desiccant packs into pill containers. As such, by using the set dimensions, the scent release insert 20 can be substituted for a desiccant pack and no new machinery is needed at the manufacturing facility to utilize the present invention system 10.

Figure 5:
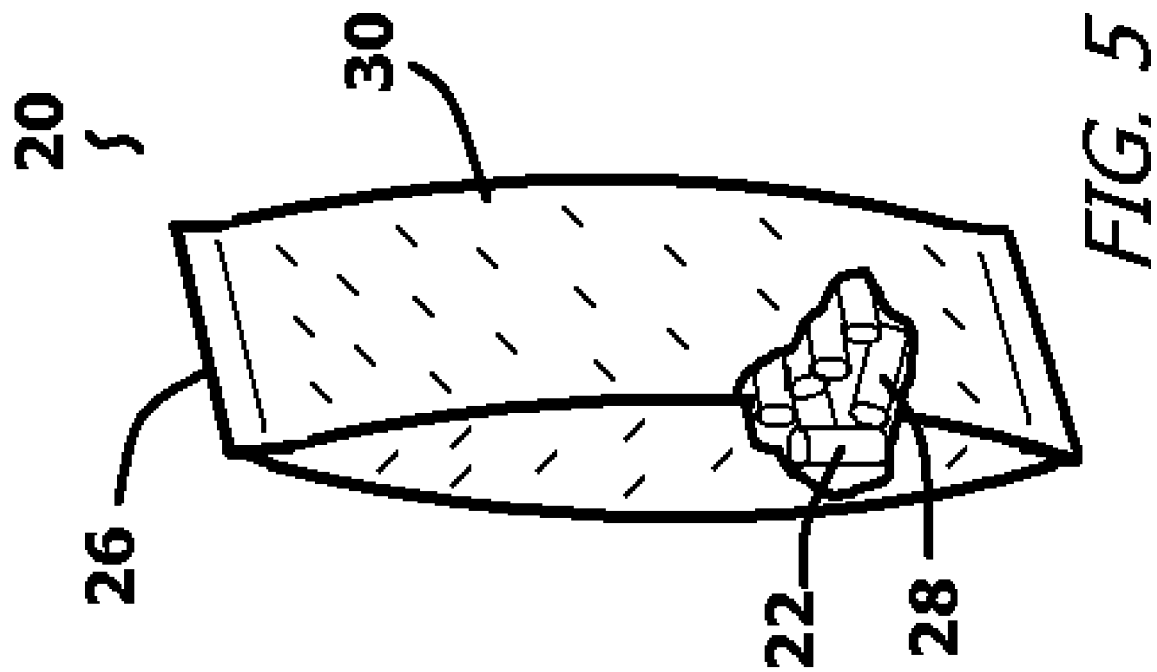
FIG. 5 shows a perspective view of a second embodiment of the scent release insert.

Referring to FIG. 5, a second construct 26 for the scent release insert 20 is shown. In this embodiment, the same plastic composition 22 used in the first construct 24 of FIG. 4 is now formed into smaller beads 28. The beads 28 are placed in a perforated packet 30. The dimensional ranges of the packet 30 are the same as the dimensional ranges of the scent release insert 20 of FIG. 4. In this manner, the dimensions of a traditional desiccant pack are maintained.

Since the plastic composition 22 is formed into beads 28, the beads 28 can move within the confines of the perforated packet 30. This enables the perforated packet 30 to better bend, flatten and otherwise deform into the various voids within a pill container 12.

Figure 6:
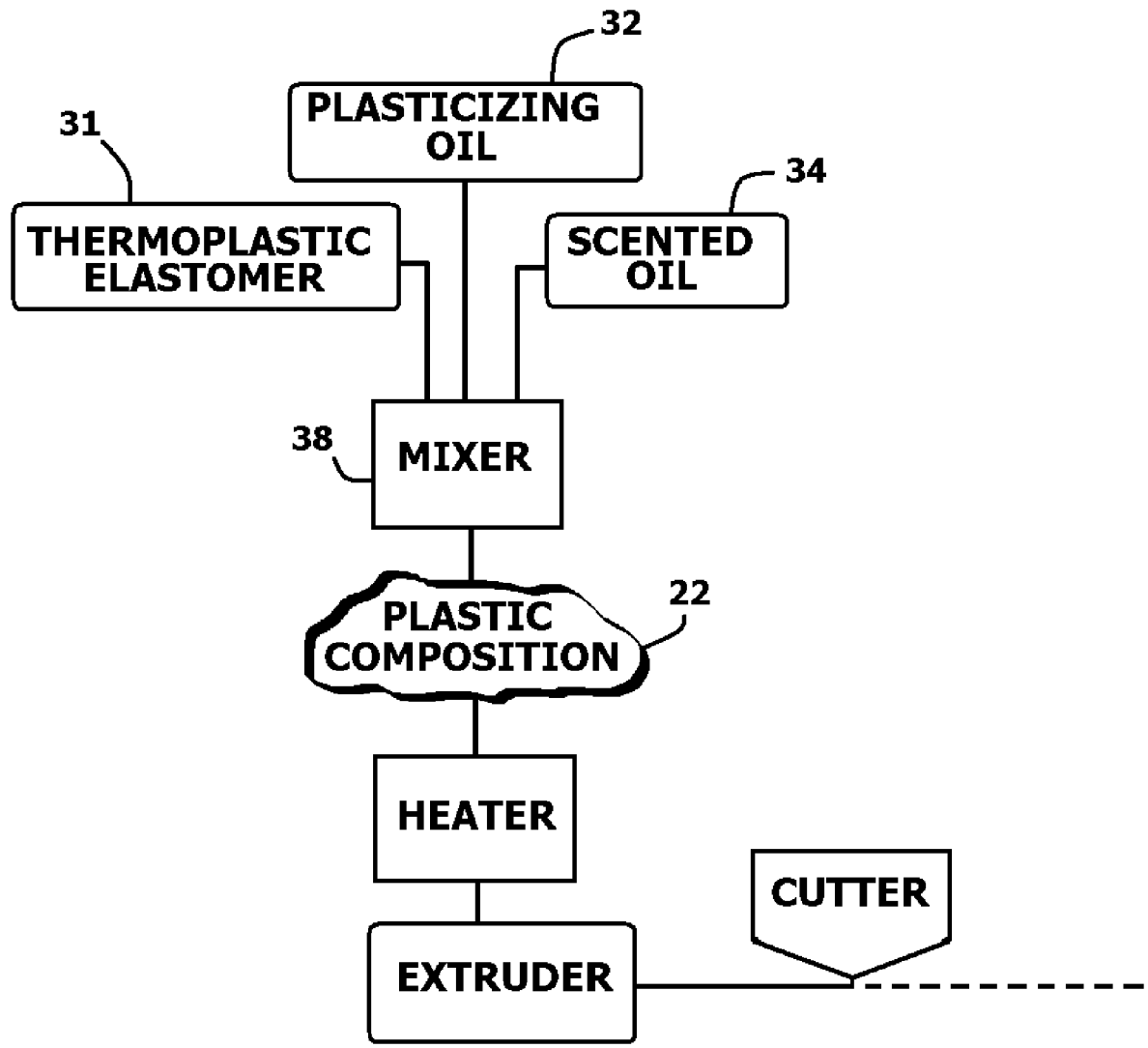
FIG. 6 shows a schematic illustrating a method of manufacture for the scent release insert.

Referring to FIG. 6, it can be seen that the plastic composition 22 of the thermoplastic elastomer used in the present invention is a polymer 31 mixed with oils. The polymer 31 is preferably a styrene-based block polymer or a vinyl-based block polymer. Suitable styrene-based block polymers include styrene-ethylene-butylene-styrene triblock copolymers and styrene-ethylene-propylene-styrene triblock copolymers. Suitable vinyl-based polymers include ethylene-vinyl acetate. Other synthetic elastomer polymers can also be used, provided the polymers are soft and non-toxic if accidentally ingested. The polymer 31 is softened by being mixed with an oil. The oil can be a scented oil 32 or a mixture of scented oil 32 with a plasticizing oil 32, such as mineral oil. However various plant oils other than mineral oil can be used. The amount of scented oil 34 mixed into the plasticizing oil 32 is between five percent and 40 percent, depending upon the olfactory potency of the scented oil 34. It is the combination of the types of polymers and scented oils used that enable such loads without having the oils migrate out of the material.

As is indicated in FIG. 6, the polymer 31, plasticizing oil 32 and scented oil 34 are all mixed together in a mixer 38 and are passed through a heater 40 that causes the polymer to melt. The resulting plastic composition 22 is extruded and cut into shape. The shape can be the first construct 24 of the scent release insert 20 of FIG. 4 or the second construct 26 of the scented beads 28 used in FIG. 5.

Returning to FIG. 1, it will be understood that the scent release insert 20 is placed in a pill container either before the pills 18 are added or as the pills 18 are added. The pills 18 will depress and deform the scent release insert 20 causing it to form in the voids in and around the pills 18. As such, the presence of the scent release insert 20 does not significantly change the capacity of the pill container 12.

The pill container 12 is sealed with the closure 16. The scent release insert 20 slowly releases scent into the interior compartment 14 of the pill container 12. The scent fills the pill container 12 and may even permeate the pills 18. When the pill container 12 is opened, the primary scent that is smelled is that of the scent release insert 20. Furthermore, as pills 18 are removed from the pill container 12, more space becomes available within the pill container 12. The scent release insert 20 is soft and acts as a cushion for the pills 18 remaining in the pill container 12. As a result, fewer of the pills 18 are damaged if the pill container 12 is moved or is otherwise accidentally shaken.

It will be understood that the embodiments of the present invention that are illustrated and described are merely exemplary and that a person skilled in the art can make many variations to those embodiments. For example, although pills are shown in the container, it will be understood that the pills can be capsules, gummy vitamins, or any other variant of a consumable dosage for a medication or dietary supplement. All such embodiments are intended to be included within the scope of the present invention as defined by the claims.

What is claimed is:

1. A system, comprising:
   a container that defines an internal compartment;
   a plurality of pills that at least partially fill said container, wherein voids exist between said plurality of pills and between said plurality of pills and said container; and
   a flexible scent release insert loosely provided within said internal compartment with said plurality of pills, wherein said flexible scent release insert has a length between twenty-five millimeters and fifty millimeters, a width that is no greater than said length and a thickness that is no greater than half said width, wherein said flexible scent release insert is made from a scented plastic composition that is comprised of a thermoplastic elastomer mixed with a plasticizing oil and a scented oil and is readily deformed by said plurality of pills within said container, therein causing said flexible scent insert to be deformed into at least some of said voids by said pills, and wherein said flexible scent release insert emits scent into said container.

2. The system according to claim 1, wherein said thermoplastic elastomer is selected from a group consisting of styrene-based block polymers and vinyl-based polymers.

3. The system according to claim 1, wherein said thermoplastic elastomer is selected from a group consisting of styrene-ethylene-butylene-styrene polymers and styrene-ethylene-propylene-styrene polymers.

4. The system according to claim 1, wherein said scent release insert is unistructurally formed from said scented plastic composition.

5. A scented insert that is loosely added to a container that contains pills to alter scent within said container, said scented insert comprising:
   a flexible elastomeric body formed from a plastic composition containing a thermoplastic elastomer, a plasticizing oil and a scented oil, wherein said flexible elastomeric body deforms into spaces between said pills within said container when mixed with said pills within said container, said flexible elastomeric body having a length, a width, and a thickness, wherein said length is longer than said width and said width is at least twice as wide as said thickness.

6. The system according to claim 5, wherein said thermoplastic elastomer is selected from a group consisting of styrene-based block polymers and vinyl-based block polymers.

7. The system according to claim 5, wherein said thermoplastic elastomer is selected from a group consisting of styrene-ethylene-butylene-styrene polymers and styrene-ethylene-propylene-styrene polymers.

8. A method for altering the scent of a container filled with pills, said method comprising the steps of:
   providing a container that defines an internal compartment;
   providing a flexible scent release insert that is made, at least in part, from an elastomeric composition that includes a thermoplastic elastomer, a plasticizing oil and scented oil;
   loosely placing said flexible scent release insert into said internal compartment of said container;
   at least partially filling said internal compartment with consumable dosage units that are selected from a group consisting of pills, capsules, and gummies, wherein said flexible scent release insert moves freely with said consumable dosage units within said internal compartment and releases scent into said internal compartment.

9. The method according to claim 8, wherein said consumable dosage units deform said flexible scent release insert within said internal compartment causing said flexible release insert to deform between said consumable dosage units.

10. The method according to claim 8, wherein said flexible scent release insert is formed from a thermoplastic elastomer.

11. The method according to claim 10, wherein said thermoplastic elastomer is selected from a group consisting of styrene-based polymers and vinyl-based polymers.

12. The method according to claim 8, wherein providing said flexible scent release insert includes providing a flexible scent release insert with a first thickness, a width at least twice as long as said thickness, and a length at least twice as long as said width.

13. The method according to claim 8, wherein providing said flexible scent release insert includes providing an air-permeable packet that contains a plurality of beads, wherein said beads are made from said elastomeric composition.

* * * * *